May 15, 1923.

F. P. MILLER 1,455,594

PROCESS OF TREATING PAPER STOCK

Filed Feb. 17, 1920     2 Sheets-Sheet 1

Inventor-
Frank P. Miller.
by his Attorneys
Howson & Howson

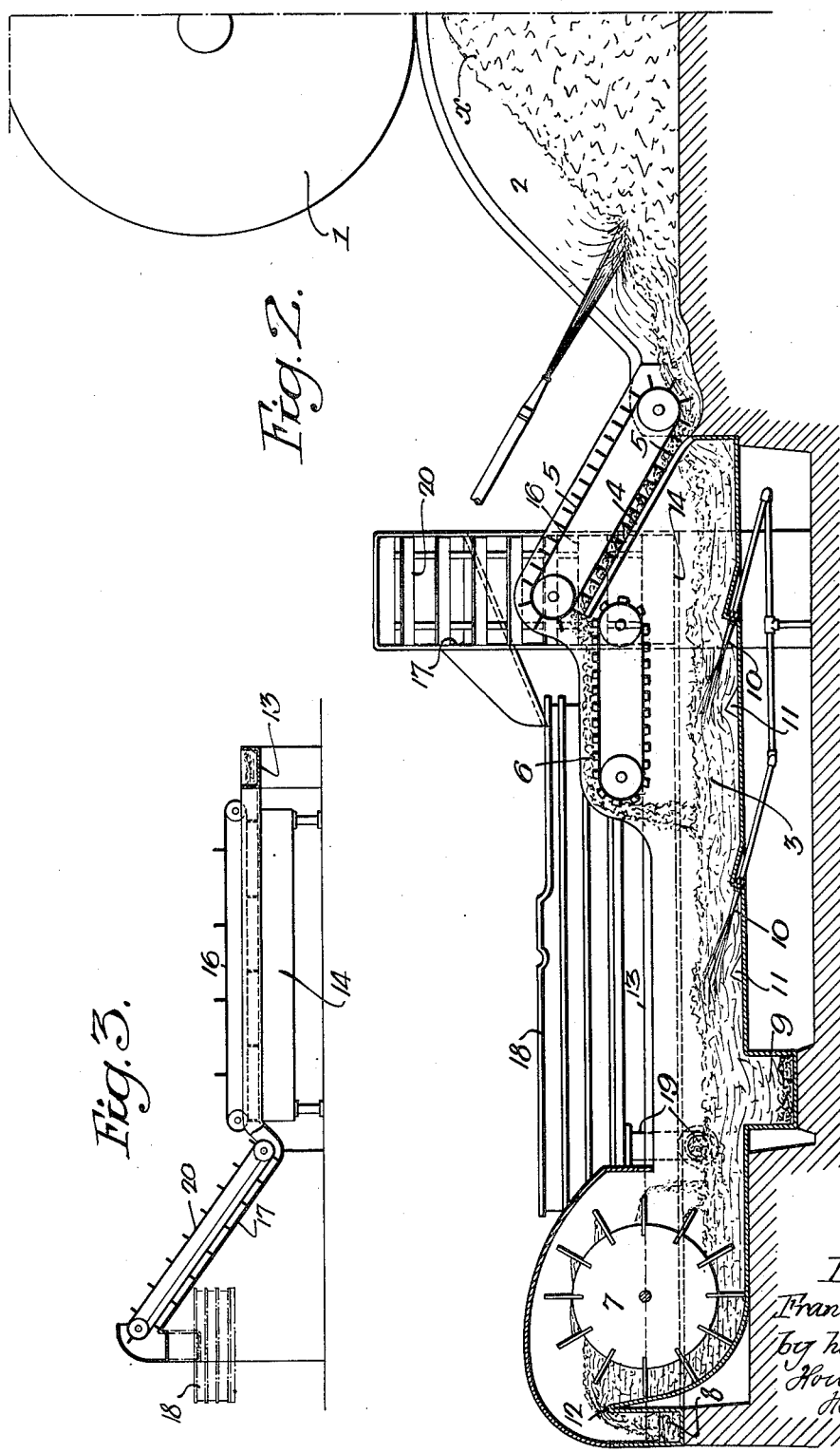

Patented May 15, 1923.

1,455,594

UNITED STATES PATENT OFFICE.

FRANK P. MILLER, OF DOWNINGTOWN, PENNSYLVANIA.

PROCESS OF TREATING PAPER STOCK.

Application filed February 17, 1920. Serial No. 359,221.

*To all whom it may concern:*

Be it known that I, FRANK P. MILLER, a citizen of the United States, residing in Downingtown, Chester County, Pennsylvania, have invented certain Improvements in a Process of Treating Paper Stock, of which the following is a specification.

My invention relates to certain improvements in the process of manufacturing paper and paper board from coarse waste paper stock, such as news, wrapping, &c.

One object of my invention is to separate the fine stock from the coarse stock prior to the stock passing into a beating engine so that only the coarse stock is reduced in the engine.

A further object of the invention is to separate and reduce the stock, after it leaves the digester, by the action of a jet of water under pressure and to allow the stock to flow, with the water, to a point where the fine particles are separated from the coarse particles.

A still further object of the invention is to provide means for allowing for the separation of foreign material from the coarse stock after it has been separated from the fine stock.

Still another object of the invention is to agitate the stock while it is being carried by the water by the injection of jets of fluid (water, steam or air) into the flowing mass.

In the accompanying drawings:

Fig. 2 is an enlarged sectional view on the line 2—2, Fig. 1, and

Fig. 3 is a sectional view on the line 3—3, Fig. 1.

Figure 1:
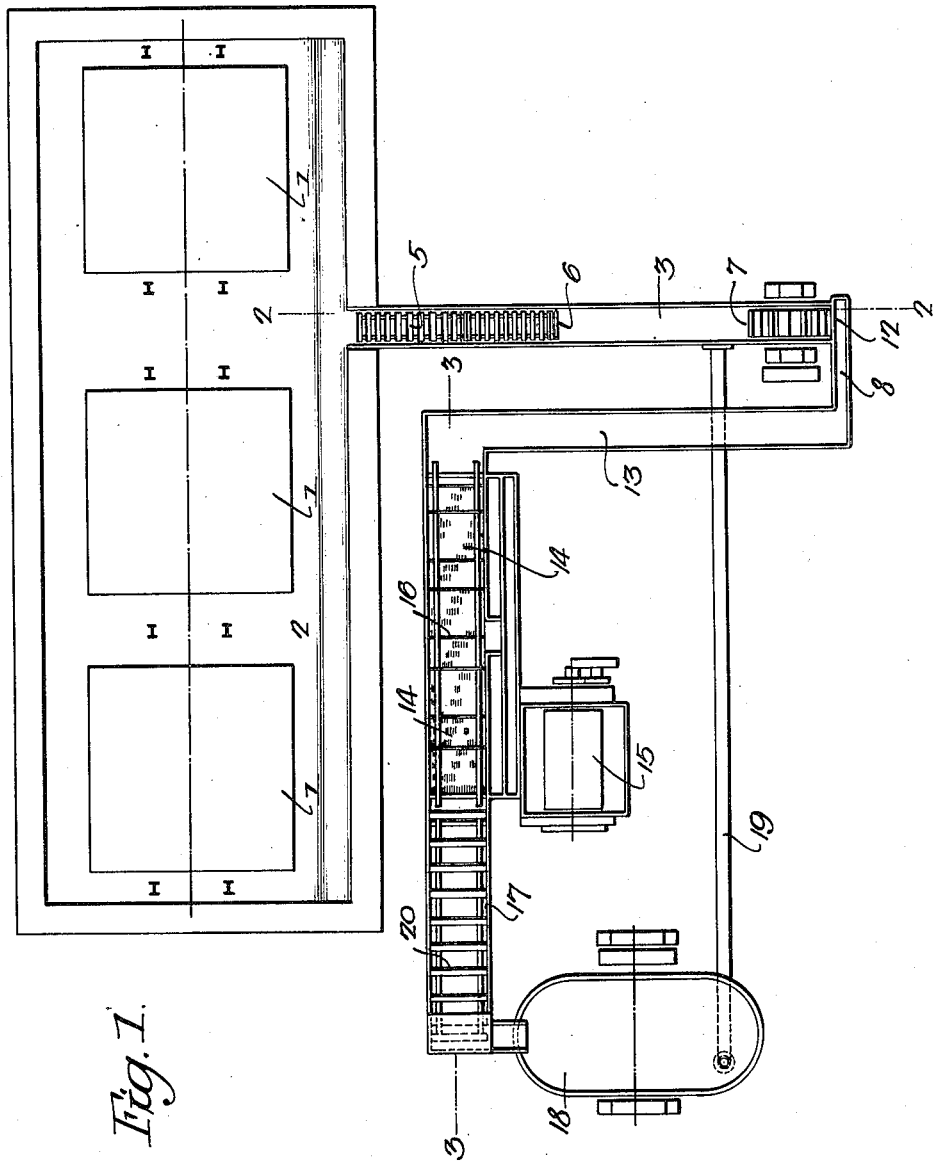
Fig. 1 is a plan view illustrating an apparatus for carrying out my invention.

Referring to the drawings, 1 is a series of rotary digesters which are charged with of the ordinary bundles and loose paper from hot water, and operated in the ordinary manner. The digesters are operated until the sizing is dissolved and the greater portion of the paper is reduced to a pulp. This action does not reduce the strings and other particles which are found with paper stock of this type. After the paper has been in the digesters for a certain length of time, it is discharged into a bin 2 and the pile of paper stock $x$ is then subjected to the action of a comparatively heavy stream of water under pressure. This water further reduces the stock and separates the fibres. The water flows from the bin 2 to a trough 3, in the present instance, carrying with it a given percentage of the fibre and the stock that has not been reduced. Before reaching the trough 3 the stock and water pass through a screen 4 made of a series of parallel bars spaced a given distance apart, which will allow the fine fibres and finely reduced stock to pass into the trough 3, while the other particles are carried up upon the screen by an endless conveyer 5 and discharged onto a horizontal slat conveyer 6, forming a sorting table in the present instance, at which point an operator is stationed, whose duty it is to remove any strings, or heavy particles, which are not desired for use in making paper. The material is then discharged into the trough 3 and flows in this trough to an elevating wheel 7, which discharges the material into a trough 8. In the bottom of the trough 3 is a pocket 9 into which any heavy foreign material may pass, such as iron, or other metals, and sand.

I preferably provide one or more nozzles 10 through which fluid, such as water, steam, or air, is projected into the liquid in the trough to agitate the material. I may provide one or more ribs 11 at the bottom of the trough 3 to act with the jets of water to stir the pulp and keep it in motion and in order to separate the heavy foreign matter from the pulp.

After the water with the pulp is discharged into the trough 8 over the weir 12 it flows through a trough 13 into a screen 14 of the usual type and the pulp that passes through the screen flows to the thickener 15 where it is prepared to flow to the stuff chest of the paper making machine. The material that is too coarse to pass through the machine is carried by the usual conveyer 16 to the end of the screen and discharged into a trough 17 on which is a conveyer 20 which carries the material up the trough and discharges it into a beating engine 18 where it is reduced to the proper degree and, when reduced, is allowed to flow through a pipe 19 back to the trough 3, where it is mixed with the stock and again over the screen 14.

Heretofore, in the manufacture of paper board and like articles from stock made from old papers, it was deemed necessary to pass the entire stock through a beating engine so as to reduce it to a proper condition to be used in the manufacture of paper board, but I find that by playing a stream of water on the paper stock after it is discharged from the digesters, I can reduce a considerable percentage of the stock without the necessity of passing it through a beating engine, and, consequently, the fibres are not broken to such an extent as is the case where the entire mass has passed through a beating engine, where the beaters act upon fine fibres, as well as upon coarse material. A much stronger paper is produced at a less cost.

While I prefer to pass the paper stock, after being subjected to the action of a stream of water, through a chute before passing it to the screen, the material may pass directly to the screen and the fine particles separated from the coarse stock at this point. While I prefer to carry the stock from the beating engine back to the screen which separated the stock originally, in some instances, a separate screen may be used for the stock reduced by the beater.

In the patent granted to me on the 24th day of October, 1922, No. 1,432,774, is illustrated an apparatus for carrying out my improved process.

I claim:

1. The process herein described of reducing paper stock to pulp, said process consisting in first treating the raw paper in a digester so as to soften the pulp and paper, then subjecting the material discharged from the digester to the action of a jet of water under pressure, then allowing the pulp to flow with the water through a screen, separating the coarse from the fine stock, then removing the strings and other particles from the coarse stock, allowing it to mix again with the fine stock, passing the stock over a screen, allowing the fine particles that flow through the screen to pass to a stuff chest and the coarse particles to flow to a beating engine, then reducing the coarse stock in the beating engine and allowing it to be screened and to flow to a stuff chest.

2. The process herein described of reducing paper stock to pulp, said process consisting in first treating the raw paper in a digester, then discharging the material from the digester, separating and further reducing the stock by the action of a jet of water, floating the stock, with the water, to a screen, separating the fine stock from the coarse stock at the screen, removing the foreign particles from the coarse stock and allowing it to mix again with the fine stock, screening the stock, thickening the particles of material that pass through the screen and allowing the material to flow to the stuff chest of a paper making machine, carrying the coarse stock to a beating engine and reducing the stock in said engine, returning the beaten stock to a point in front of the screen.

3. The process herein described of preparing paper stock in the manufacture of paper, said process consisting in placing rough paper stock in a digester, mixing the paper in the digester, discharging the paper onto a pile, reducing the paper stock by the projection of water under pressure against the paper of the pile, allowing the stock to flow, with the water, and separating the fine particles of the stock from the coarse particles, then allowing the fine particles to flow directly to a paper making machine without beating, the coarse particles being passed through a beating engine and reduced.

4. The process herein described of preparing paper stock in the manufacture of paper, said process consisting in placing news and other paper stock in a digester, separating the stock in the digester so as to soften it and partially reduce it, then discharging the stock from the digester into a pile, projecting a stream of water under pressure against the pile so as further to reduce the stock, allowing the stock to flow, with the escaping water, to a screen, where the fine particles are separated from the coarse particles, separating the twine and like foreign particles from the coarse stock, returning the coarse stock to the fine stock, then passing the entire stock over a second screen which finally separates the fine stock from the coarse stock, then reducing the coarse stock in a beating engine, and conveying the beaten stock to a point in front of the last screen, while the screened stock passes to a paper making machine.

5. The process herein described of reducing paper stock in the manufacture of paper, said process consisting in first reducing the stock in a digester, discharging the stock from the digester onto a pile, reducing the pile by the action of a jet of water under pressure, conveying the stock, with the water, to a screen and separating the coarse particles from the fine particles, allowing the fine particles to flow through a channel in which any heavy foreign material will collect, subjecting the material to the action of a jet of fluid while passing through the channel, passing the particles of material over a screen to separate the fine particles from the coarse particles so that the fine particles can be used, without further reduction, in the manufacture of paper.

FRANK P. MILLER.